US009775292B2

(12) United States Patent
Horning et al.

(10) Patent No.: US 9,775,292 B2
(45) Date of Patent: Oct. 3, 2017

(54) NON-ROW SENSITIVE FORAGE HARVESTER HEADER

(71) Applicant: Horning Manufacturing, LLC, East Earl, PA (US)

(72) Inventors: Leon Z. Horning, East Earl, PA (US); Marvin N. Huber, Narvon, PA (US); Leon H. Horning, Jr., East Earl, PA (US); Nathaniel H. Horning, East Earl, PA (US)

(73) Assignee: Horning Manufacturing, LLC, East Earl, PA (US)

( * ) Notice: Subject to any disclaimer, the term of this patent is extended or adjusted under 35 U.S.C. 154(b) by 64 days.

(21) Appl. No.: 14/703,015

(22) Filed: May 4, 2015

(65) Prior Publication Data

US 2016/0324070 A1 Nov. 10, 2016

(51) Int. Cl.
*A01D 45/02* (2006.01)
*A01D 43/08* (2006.01)

(52) U.S. Cl.
CPC ......... *A01D 43/082* (2013.01); *A01D 45/021* (2013.01)

(58) Field of Classification Search
CPC ..... A01D 45/021; A01D 45/02; A01D 43/082
USPC ................ 56/51, 14.5, 62, 94, 119
See application file for complete search history.

(56) References Cited

U.S. PATENT DOCUMENTS

| | | | |
|---|---|---|---|
| 5,237,804 A | 8/1993 | Bertling et al. | |
| 5,722,225 A | 3/1998 | Wuebbels et al. | |
| 6,032,444 A | 3/2000 | Herron et al. | |
| 6,298,643 B1 * | 10/2001 | Wuebbels | A01D 43/082 56/119 |
| 6,701,702 B2 * | 3/2004 | Wubbels | A01D 43/082 56/103 |
| 6,826,897 B2 * | 12/2004 | Wubbels | A01D 43/082 56/51 |
| 7,010,903 B2 * | 3/2006 | Bruening | A01D 43/082 56/51 |
| 7,024,846 B2 | 4/2006 | Bruening | |
| 7,028,458 B2 * | 4/2006 | Bruening | A01D 43/082 56/51 |
| 7,222,478 B2 * | 5/2007 | Bruening | A01D 43/082 56/503 |
| 7,571,592 B2 * | 8/2009 | Rickert | A01D 43/082 56/157 |
| 8,104,254 B2 * | 1/2012 | Luetke-Harmann | A01D 45/021 56/119 |

(Continued)

*Primary Examiner* — John G Weiss
(74) *Attorney, Agent, or Firm* — Miller Law Group, PLLC

(57) ABSTRACT

A non-row sensitive forage harvester header utilizes a single rotary transfer member to convey severed crop material from the forwardly positioned rotary cutting members to the feed rolls of the forage harvester. A fixed guide plate dislodges severed crop from the right cutting member to transfer the crop material to the left cutting member to convey the crop further rearwardly to the rotary transfer member. Additional fixed guide plates establish a flow path for the severed crop material and facilitate the movement of the severed crop from the left cutting member to the rotary transfer member and then to the feed rolls. A drive mechanism is provided to power the rotation of the cutting members and the rotary transfer member with a cutting disk on each cutting member being driven faster than the multiple crop engaging members also carried on the cutting members above the cutting disk.

17 Claims, 10 Drawing Sheets

(56) References Cited

U.S. PATENT DOCUMENTS

| | | | | |
|---|---|---|---|---|
| 8,650,846 B2* | 2/2014 | Wuebbels | ............ | A01D 43/082 56/94 |
| 9,386,745 B2* | 7/2016 | Boenig | ................ | A01D 45/021 |
| 2005/0132688 A1* | 6/2005 | Resing | ................ | A01D 43/082 56/51 |

* cited by examiner

NON-ROW SENSITIVE FORAGE HARVESTER HEADER

CROSS-REFERENCE TO RELATED APPLICATIONS

This application claims domestic priority on U.S. Provisional Patent Application Ser. No. 62/015,108, filed on Jun. 20, 2014, the content of which is incorporated herein by reference.

FIELD OF THE INVENTION

The present invention relates generally to forage harvesters for harvesting and chopping stalky crop, and more particularly to a forage harvester header that is operable to cut row crops, such as corn, without regard to the orientation of the forage harvester header relative to the rows of crop being harvested.

BACKGROUND OF THE INVENTION

Conventional forage harvester headers for cutting and chopping row crops, such as corn, are constructed with row units that require at least general alignment with the rows of crop being harvested. The forage harvester row units sever the standing row crop from the ground and convey the severed crop rearwardly to be chopped into small pieces by the rotating cutterhead. Row crops are planted in rows that are spaced a predetermined uniform distance from one another; however, this predetermined row spacing can be different from crop to crop and from one farmer to another. Accordingly, it has been desirable to provide a crop harvesting header that is operable to sever row crops irrespective of the row spacing, or even the direction of the rows relative to the forage harvester header as the machine is moved across a field. Moreover, current farming practices have some traditionally row crops planted in a non-row seeding patterns. Such non-row crops can be harvested by a forage harvesting header that is non-row sensitive.

To meet this need for a non-row sensitive forage harvester header, headers have been constructed with at least one, and usually two, rotatable cutting members at the forward, crop-engaging portion of the forage harvester header. This at least one rotatable cutting member is driven to sever the crop across substantially the entire working width as the header as the machine is moved across the field. All of the crop located in front of the header, irrespective of row spacing, or even the existence of row placement, is severed by the rotating cutting member. The cutting members capture the crop material and convey the severed crop material rearwardly with the rotation of the cutting member to a pair of rotating transfer members that receive the severed crop material from the cutting members and transfers the severed crop to the cutterhead for further harvesting treatment. These transfer members are often formed as a drum-shaped body having a plurality of circumferentially spaced fingers arranged in vertically spaced rows along the periphery of the drum surface. Alternatively, the transfer members may comprise a plurality of vertically spaced coaxial discs provided with a plurality of peripheral recesses for receiving the stalks.

The conventional transfer members have encountered difficulty in delivering the severed stalks to the cutterhead. This problem can be attributed to the path defined between the transfer member and the cutterhead for the movement of the row crop, as the row crop is not controlled in movement into the cutterhead. After conventional transfer members disengage the severed row crop in front of the cutterhead the row crop needs to be conveyed into the cutterhead for a distance without engagement of the transfer members to cause the flow of the crop material to enter the cutterhead in an orientation with the severed end being fed into the cutterhead first. For this reason, the flow of crop material into the cutterhead can become clogged. These problems are more evident in high capacity forage harvesters that utilize more than one transfer member rearwardly of the cutting members.

In U.S. Pat. No. 7,024,846, granted on Apr. 11, 2006, to Ulrich Bruening, the crop harvesting header is constructed with four rotary members that engage standing crop material to sever the standing crop material and convey the severed crop rearwardly into a chopping mechanism. The movement of the severed crop material is facilitated by the formation of chutes that capture ears of corn for delivery rearwardly to the chopping mechanism.

A non-row sensitive forage harvester header is disclosed in U.S. Pat. No. 6,032,444, granted to Mar. 7, 2000, to Maynard M. Herron, et al, wherein a pair of rotary disk cutters is disposed at the forward end of the header to engage standing row crop material. The disk cutters sever the standing crop which is trapped in the counter rotating rotors by endless gripping members that are entrained around the rotary disk cutters. The endless gripping members extend rearwardly from the corresponding disk cutters to trap the severed crop material between the opposing gripping members to convey the severed crop material rearwardly. The header is formed with upper and lower runs of gripping members with the upper runs being entrained around the upper portions of the rotary disk cutters to guide the severed crop trapped in the lower opposing runs of gripping members.

A non-row sensitive forage harvester header is taught in U.S. Pat. No. 5,722,225, issued to Richard Wuebbels, et al, on Mar. 3, 1998. The header is formed with multiple transversely spaced rotary disk cutters that are operable to sever standing row crop material, irrespective of the orientation of the row of crop material to the approaching disk cutters. The rotary disk cutters are operable to convey the severed crop material to a rearward portion of the header where multiple rotary transfer disks are positioned to convey the severed crop material toward the center of the header to be fed into the chopping mechanism. Similarly, the non-row sensitive forage harvester header disclosed in U.S. Pat. No. 5,237,804, issued on Aug. 24, 1993, to Alfred Bertling, et al, is formed with multiple transversely arrayed rotary disk cutters that convey crop material severed thereby rearwardly to a pair of rotary transfer drums that direct the severed crop material into the chopping mechanism.

Accordingly, it would be desirable to provide a non-row sensitive forage harvester header that utilizes a single transfer member cooperable with two counter-rotating cutting members to effectively feed severed row crop material into a cutterhead for chopping the row crop material into smaller pieces.

SUMMARY OF THE INVENTION

It is an object of this invention to overcome the aforementioned disadvantages of the prior art by providing a non-row sensitive forage harvester having a single stuffer mechanism for feeding the collected crop material into the feed rolls of a forage harvester.

It is another object of this invention to provide a non-row sensitive forage harvester header formed with a pair of large diameter rotary cutting members that sever standing crop material and convey the severed crop material rearwardly to a rotary transfer member that delivers the severed crop material into the feed rolls of the forage harvester.

It is a feature of this invention to provide a forage harvester header having rotary disk cutting members formed with multiple crop engaging members that operate to sever the crop and to convey the severed crop rearwardly toward the feed rolls of the forage harvester.

It is another feature of this invention that each of the rotary disk cutting members include a lowermost transfer disk formed with a plurality of circumferentially spaced sweeper members that are bent downwardly to terminate immediately above a cutting disk.

It is an advantage of this invention that the circumferentially spaced sweeper members work in conjunction with the angled transfer arms to move severed crop material radially inwardly into engagement with two vertically spaced transfer disks.

It is another advantage of this invention that the severed crop material is wedged between prongs on the transfer disk to facilitate the movement of the severed crop circumferentially around the periphery of the rotary cutting members.

It is still another advantage of this invention that the rotary cutting members are counter-rotated so that each rotary cutting member 20 delivers severed crop material inwardly toward the center of the header.

It is still another feature of this invention that the central portion of the header is formed with a first fixed guide plate adjacent to the right cutting member to force the severed crop material to dislodge from the right cutting member and move into engagement with the left cutting member.

It is yet another feature of this invention that the central portion of the header is also formed with a second fixed guide plate to form a flow channel with the first fixed guide plate to direct the rearward movement of the severed crop material into engagement with the periphery of the left cutting member.

It is a further feature of this invention that a third fixed guide plate is supported on the frame adjacent the left cutting member 20b to dislodge the severed crop material from the left cutting member and move the severed crop rearwardly into engagement with a rotary transfer member positioned rearwardly of the rotary cutting members.

It is a further advantage of this invention that the third fixed guide plate is spaced from the rearward portion of the first fixed guide plate 31 and forms a flow channel for delivering the severed crop material into engagement with the rotary transfer member.

It is another feature of this invention that the central portion of the header is formed with fourth and fifth fixed guide plates to disengage the severed crop from the rotary transfer member and to create a flow channel defining a discharge path into the cutterhead.

It is still another feature of this invention that the single rotary transfer member is positioned between the two rotary cutting members and rearwardly thereof to receive severed crop material from the two rotary cutting members and to transfer the crop material into the rearwardly positioned cutterhead.

It is yet another feature of this invention that the rotary transfer member is driven at a faster rotational speed than the two cutting members so that the periphery of the rotary transfer member matches the speed of the periphery of the larger diameter left cutting member.

It is another advantage of this invention that the matched speeds of the peripheries of the rotary transfer member and the left cutting member facilitates the transfer of the severed crop material from the left cutting member to the rotary transfer member.

It is still another object of this invention to provide a non-row sensitive forage harvester header which is durable in construction, inexpensive of manufacture, carefree of maintenance, facile in assemblage, and simple and effective in use.

These and other objects, features and advantages are accomplished according to the instant invention by providing a non-row sensitive forage harvester header utilizing a single rotary transfer member to convey severed crop material from the forwardly positioned rotary cutting members to the feed rolls of the forage harvester. A fixed guide plate dislodges severed crop from the right cutting member to transfer the crop material to the left cutting member to convey the crop further rearwardly to the rotary transfer member. Additional fixed guide plates establish a flow path for the severed crop material and facilitate the movement of the severed crop from the left cutting member to the rotary transfer member and then to the feed rolls. A drive mechanism is provided to power the rotation of the cutting members and the rotary transfer member with a cutting disk on each cutting member being driven faster than the multiple crop engaging members also carried on the cutting members above the cutting disk.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
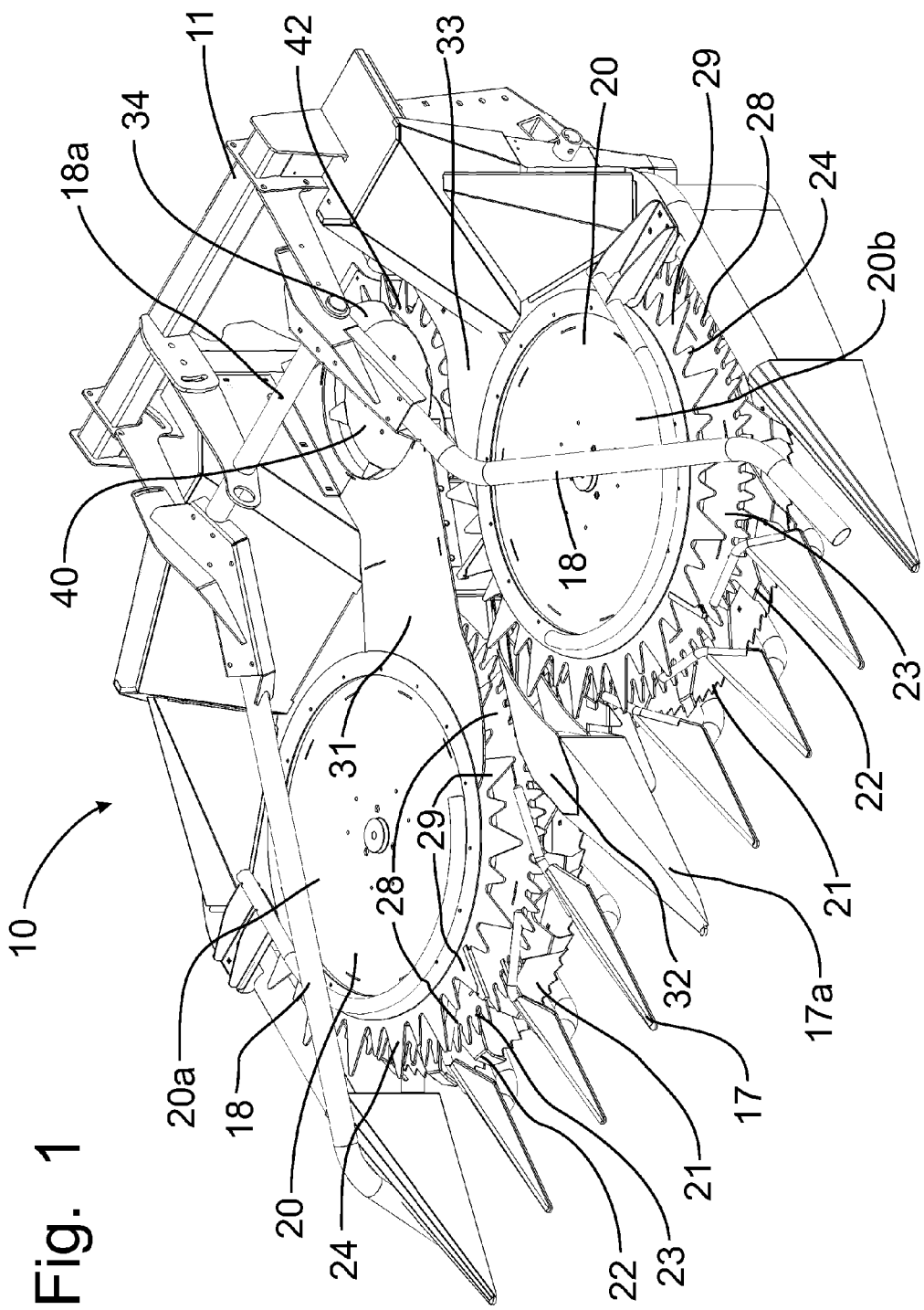
FIG. 1 is a left front perspective view of the non-row sensitive forage harvester header incorporating the principles of the instant invention, the header is shown as being detached from a forage harvester unit containing the chopping mechanism.

Referring to the drawings a non-row sensitive forage harvester header incorporating the principles of the instant invention can best be seen. Any references to left or right are used as a matter of convenience and are determined by standing behind the forage harvester header and facing the uncut crop material, looking into the normal direction of travel for the operating forage harvester header. The non-row sensitive forage harvester header 10 has an operating width that is defined by the width of the two rotatable cutting members 20 supported on a frame 11 to engage the standing crop material and sever the standing crop material from the ground and convey the severed crop material rearwardly in a manner described in greater detail below.

The overall exterior views of the non-row sensitive forage harvester header 10 are shown in FIGS. 1-5. The header 10 is detachably mountable to a forage harvester base unit (not shown), which one of ordinary skill in the art will understand provides a source of rotational power and a chopping mechanism that is positioned to receive a flow of severed crop material from the header 10, as described in greater detail below. Typically, the forage harvester base unit (not shown) is a pull-type machine that is coupled to a prime mover, such as a tractor that provides motive, hydraulic and rotational power to the base unit, and ultimately to the header 10. The header 10 includes a frame 11 that has a base unit mounting member 12 at the rearward portions of the header 10 to permit a detachable connection of the header 10 to the forage harvester base unit (not shown).

The header 10 is preferably formed with a pair of transversely spaced rotary disk cutting members 20 at the forward periphery of the header 10 to engage standing crop material and to sever the crop material from the ground for further subsequent processing treatment. The rotary disk cutting members 20 having multiple crop engaging members that operate to sever the crop and to convey the severed crop rearwardly, as will be described in greater detail below. Each disk cutting member 20 is formed with a lower cutting disk 21 at a lower portion thereof and rotatably driven, as described in greater detail below, to sever standing crop material upon engagement therewith. Above the cutting disk 21 the rotary cutting member 20 has a plurality of transfer disks 22-24, whose function is to gather the severed crop material and transfer the severed crop material rearwardly for further harvesting treatment.

The lowermost of the transfer disks 22 has a plurality of circumferentially spaced sweeper members 26 that are bent downwardly to terminate immediately above the cutting disk 21. The sweeper members 26 work in conjunction with the angled transfer arms 27 to move the severed crop material radially inwardly into engagement with the two vertically spaced transfer disks 23, where the severed crop material is wedged between prongs 28, 29 on the respective transfer disks 23, 24 to move the severed crop circumferentially around the periphery of the rotary cutting members 20.

The angled transfer arms 27 are mounted on forwardly projecting crop guides 17 and are positioned with respect to the rotary cutting members 20 to direct the severed crop material into engagement with the prongs 28, 29 on the transfer disks 23, 24. Elevated crop guides 18, 18a are supported on the frame 11 to help direct the movement of the severed crop material so that the severed butt end of the crop is oriented to feed rearwardly first into the cutterhead before the rest of the severed crop.

The rotary cutting members 20 are counter-rotated such that each rotary cutting member 20 delivers severed crop material inwardly toward the center of the header 10. A first fixed guide plate 31 is supported on the frame 11 adjacent to the right cutting member 20a to force the severed crop material engaged with the upper transfer disks 23, 24 to dislodge from the prongs 28, 29 and move into engagement with the prongs 28, 29 on the left cutting member 20b. Thus, as can be seen best in FIG. 2, the right cutting member 20a conveys the severed crop material around the periphery of the right cutting member 20a to about the 3:00 o'clock position where the first fixed guide plate 31 pushes the severed crop material over to the left cutting member 20b. For purposes of reference, the positions of the clock referred to within this description are determined by standing at the front of the header and looking rearwardly over top of the respective left and right cutting members 20a, 20b. A second fixed guide plate 32 is mounted on the center crop guide 17a to form a flow channel with the first fixed guide plate 31 that directs the rearward movement of the severed crop material into the periphery of the left cutting member 20b.

Similarly, a third fixed guide plate 33 is supported on the frame adjacent the left cutting member 20b to dislodge all of the severed crop material being conveyed by the upper transfer disks 23, 24 on the left cutting member 20b and move the severed crop rearwardly into engagement with the rotary transfer member 40 positioned rearwardly of the rotary cutting members 20 and generally centrally on the header 10. The third fixed guide plate 33 is spaced from the rearward portion of the first fixed guide plate 31 and forms a flow channel for delivering the severed crop material into engagement with the rotary transfer member 40.

Similar to the rotary cutting members 20, the transfer member 40 is formed with a pair of vertically spaced transfer disks 42, 43 formed with radially projecting prongs 46, 47 that wedge the severed crop therebetween to effect conveying the severed crop material circumferentially around a portion of the rotary transfer member 40. In addition, the rotary transfer member 40 is formed with a rotatable floor member 44 that rotates with the transfer disks 42, 43 and underlies the flow path of the severed crop material along the circumferential periphery of the rotary transfer member to support the severed crop material in engagement with the transfer disks 42, 43. The top surface of the rotary transfer member 40 is provided with upwardly angled tabs 49 that rotate with the transfer disks 42, 43 to dislodge any crop material that might fall on top of the rotary transfer member 40.

A fourth fixed guide plate 34 is supported on the frame 11 to cooperate with the rotary transfer member 40 by dislodging the severed crop away from the prongs 46, 47. A fifth fixed guide plate 35 is supported on the frame 11 adjacent to, but spaced from, the fourth fixed guide plate 34 to define a flow channel that defines a discharge path from the header 10 into the cutterhead (not shown) that would be located on the base unit (not shown) immediately rearwardly of the fourth and fifth fixed guide plates 34, 35. With the transverse cross guide member 18a positioned above and forwardly of the rotary transfer member 40, the movement of row crops would be such that the cross guide member 18a knocks the tall crop into a substantially horizontal orientation as the severed butt end of the crop is captured by the rotary transfer member 40 and moved rearwardly into the flow path formed between the fourth and fifth fixed guide plates 34, 35.

Figure 10:
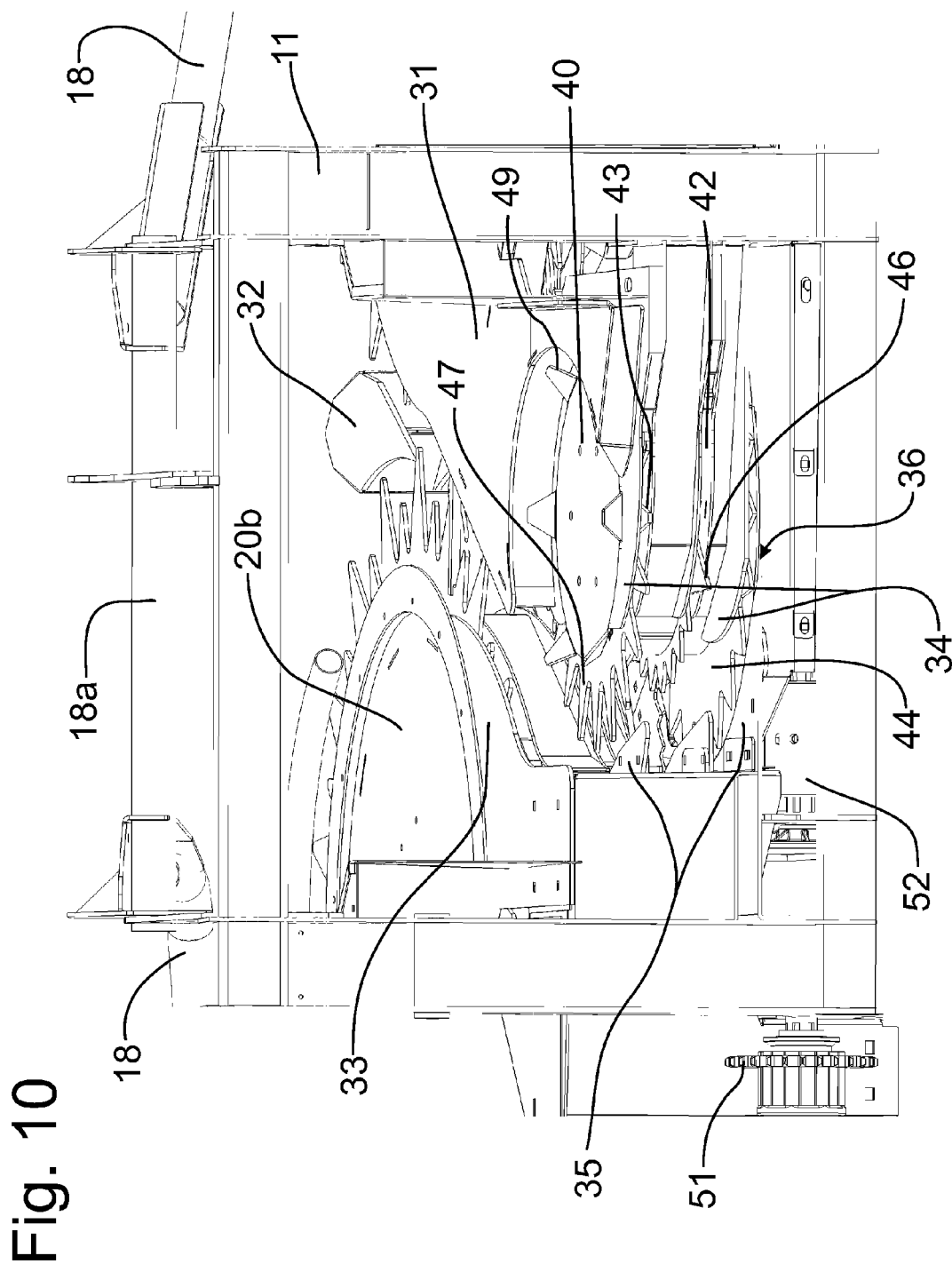
FIG. 10 is a partial cross-sectional view of the header taken along lines 10-10 of FIG. 3 with the forward end of the header tilted upwardly to present a perspective view of the cross-section to depict the configuration of the rotary transfer member and the fixed guide plates defining a flow path for the discharge of severed crop material rearwardly.

The fourth and fifth fixed guide plates 34, 35 are constructed as multi-layered weldments, as is best seen in FIG. 10. For example, the fourth fixed guide plate 34 has an upper component that cooperates with the upper transfer disk 43, a middle component that cooperates with the lower transfer disk 42, and a larger floor component that cooperates with the rotatable floor member 44 to dislodge crop material from the rotary transfer member 40. To provide the flow path for the movement of the crop material, the fifth fixed crop guide 35 is constructed in the same opposing manner with an upper component, a middle component and a floor component, as can be seen in FIG. 10. The floor component of the fourth fixed guide plate 34 is elevated slightly above the opposing floor component of the fifth fixed guide plate 35 to define a discharge slot 36 through which weeds and other accumulated non-crop material can pass to be discharged through the header 10 without being fed into the rearward cutterhead.

In operation, the non-row sensitive forage harvester header 10 is connected to a prime mover (not shown) to provide a source of rotational, hydraulic and motive power to the header 10 and the header 10 is driven into a field of standing row crop. The rotating cutting members 20 engage and sever the lower portion of the crop from the ground by the cutting disk 21. The transfer disks 22-24 capture the severed crop and then guide the severed crop around the front periphery of the cutting members 20 toward the center of the header 10. Once adjacent the center of the header 10, the first fixed guide plate 31 dislodges the severed crop from the right cutting member 20a at about the 3:00 o'clock position on the right cutting member 20a and with the second fixed guide plate 32 directs the severed crop into engagement with the transfer disks 22-24 on the left cutting member 20b at about the 9:00 o'clock position on the left cutting member.

A third fixed guide plate 33 dislodges the crop material from the left cutting member 20b, which would include the crop originally severed by the cutting disk 21 on the left cutting member 20b and the severed crop material transferred from the right cutting member 20a, at about the 11:00 o'clock position on the left cutting member 20b. The first and third fixed cutting plates 31, 33 form a flow path for the movement of the crop material from the left cutting member 20b into engagement with the rotary transfer member 40. The fourth fixed guide plate 34 strips the severed crop from the transfer disks 42,43 of the rotary transfer member 40 and with the cooperation of the fifth fixed guide plate 35 guides the severed crop into the rearwardly positioned cutterhead.

Figure 2:
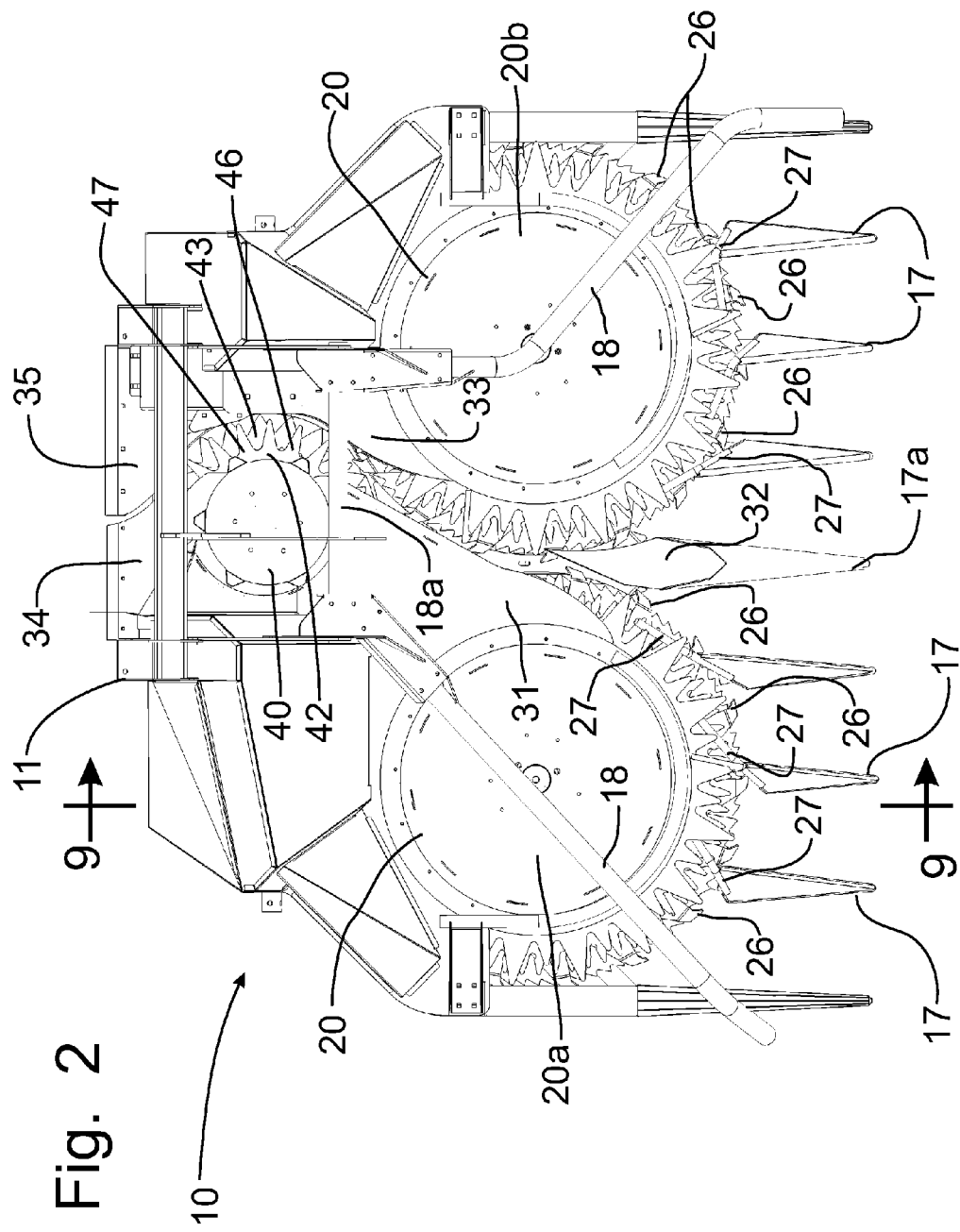
FIG. 2 is a top plan view of the non-row sensitive forage harvester header depicted in FIG. 1.
Figure 3:
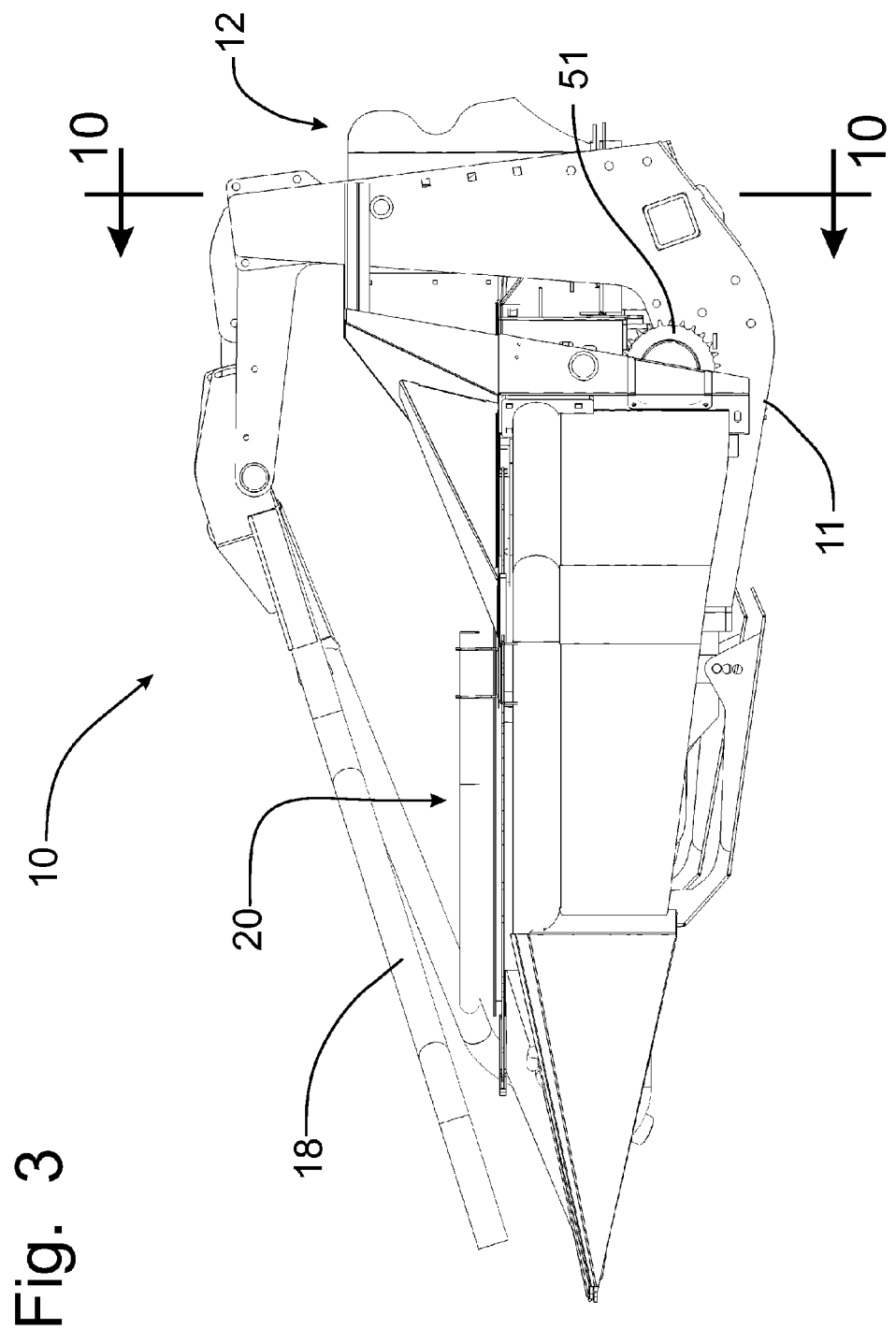
FIG. 3 is a left side elevational view of the non-row sensitive forage harvester header shown in FIG. 1.
Figure 4:
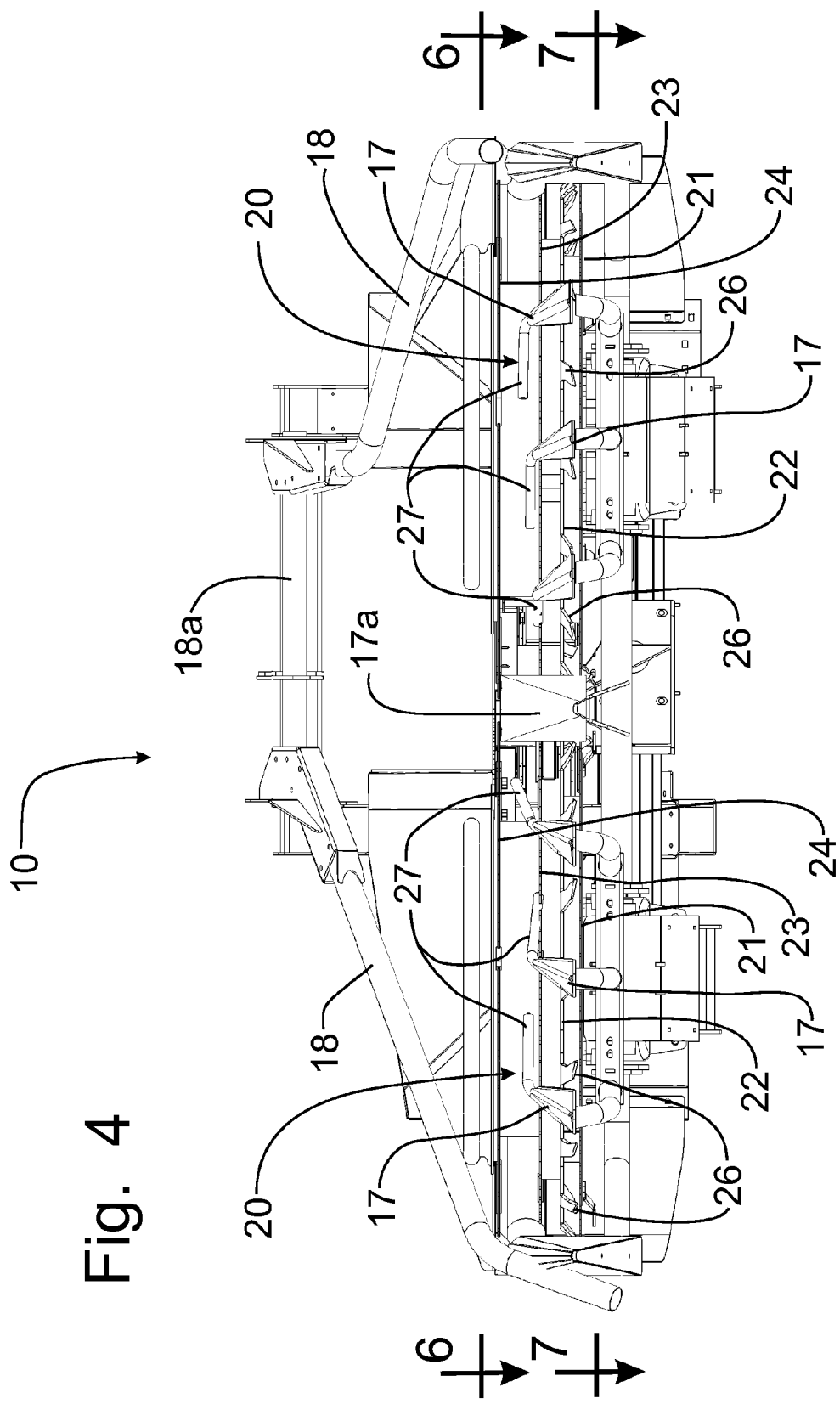
FIG. 4 is a front elevational view of the non-row sensitive forage harvester header depicted in FIG. 1.
Figure 5:
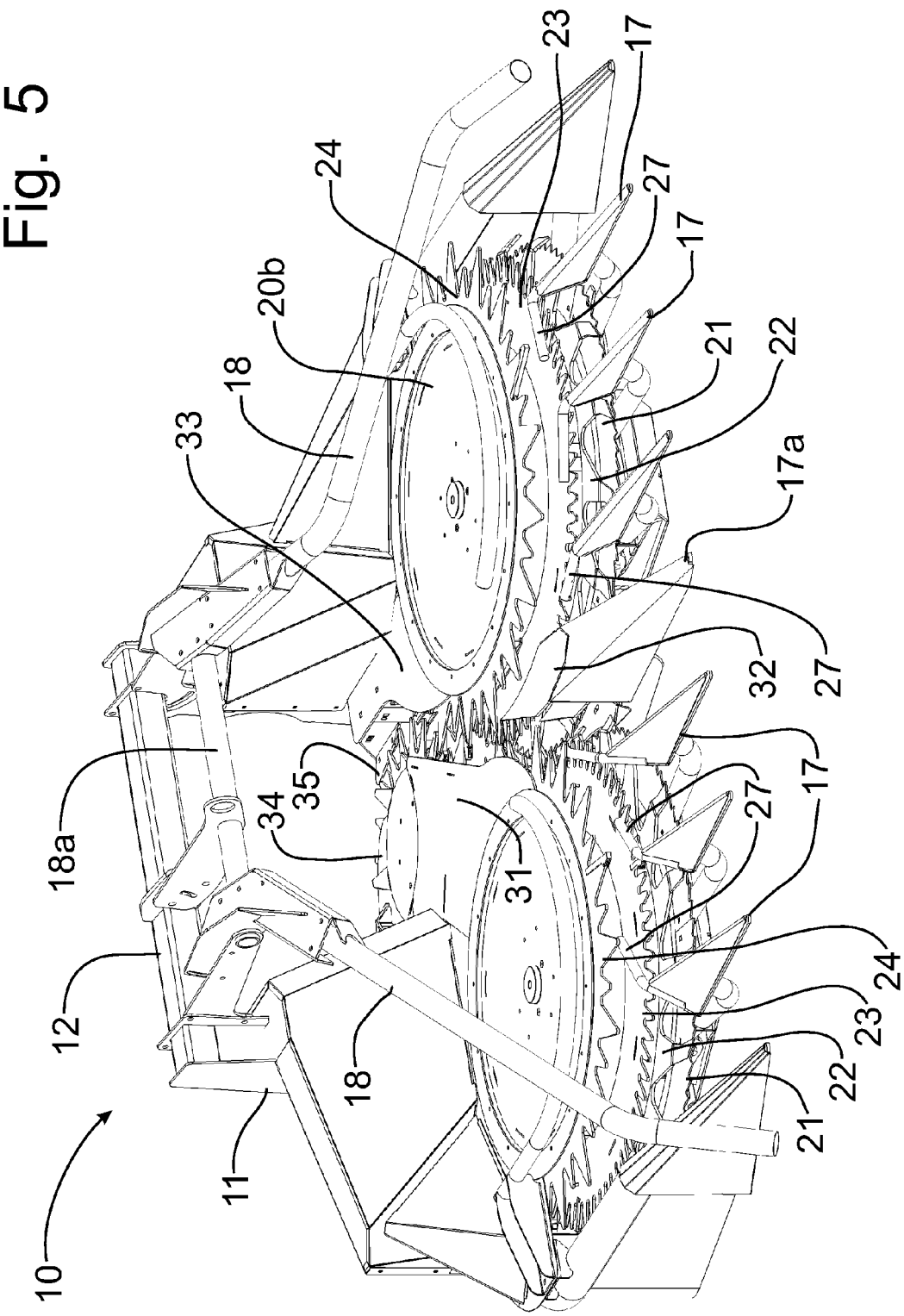
FIG. 5 is a right front perspective view of the non-row sensitive forage harvester header, taken generally in alignment with the flow path of the crop material being transferred from the right rotary disk cutting member to the right rotary disk cutting member and then to the rotary transfer member.
Figure 6:
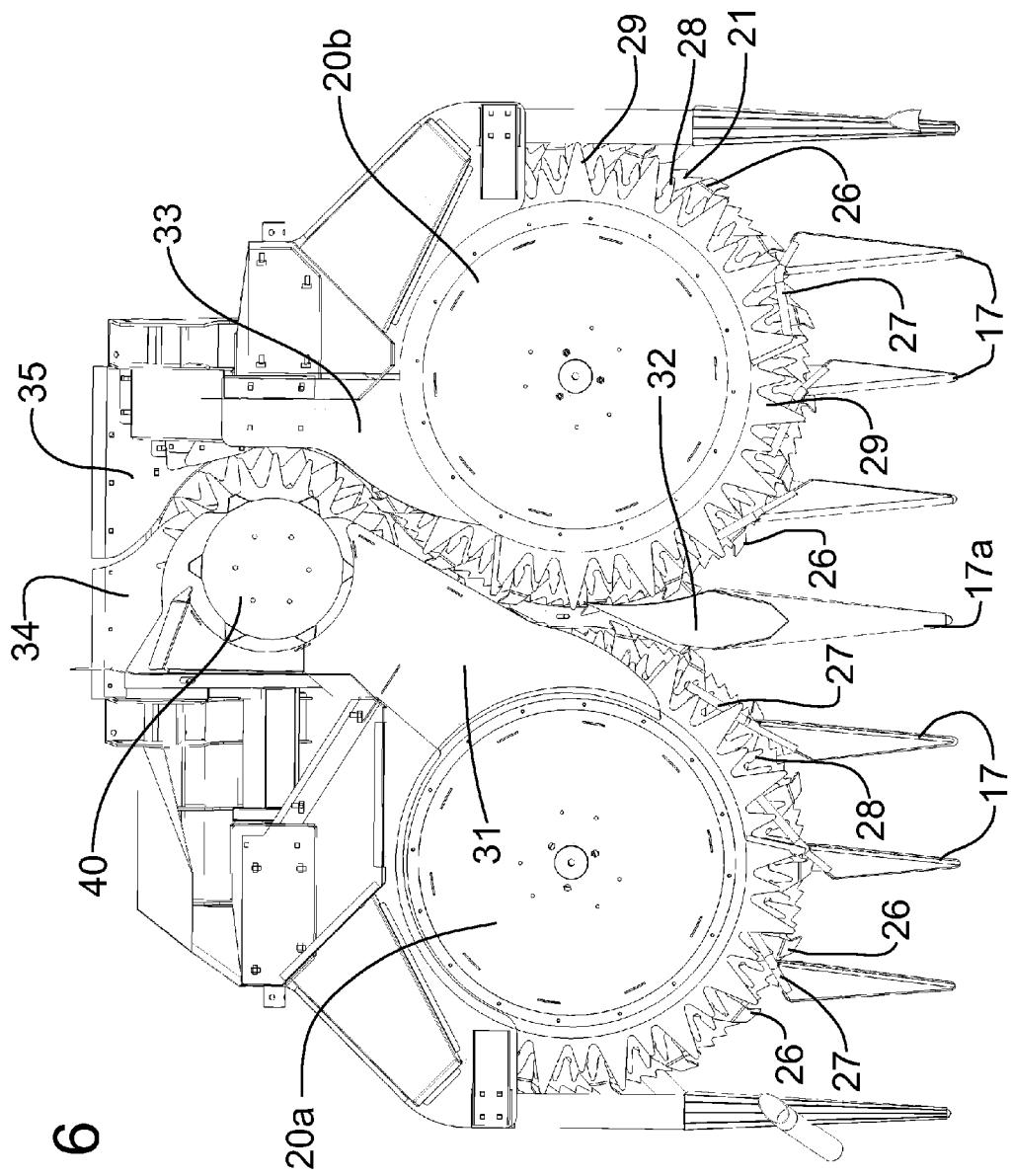
FIG. 6 is a cross-section view corresponding to lines 6-6 of FIG. 4 to provide a top plan view of the two rotary disk cutting members at the front of the header and the single rotary transfer member positioned between the disk cutting members and rearwardly thereof to direct the severed crop material toward the chopping mechanism.
Figure 7:
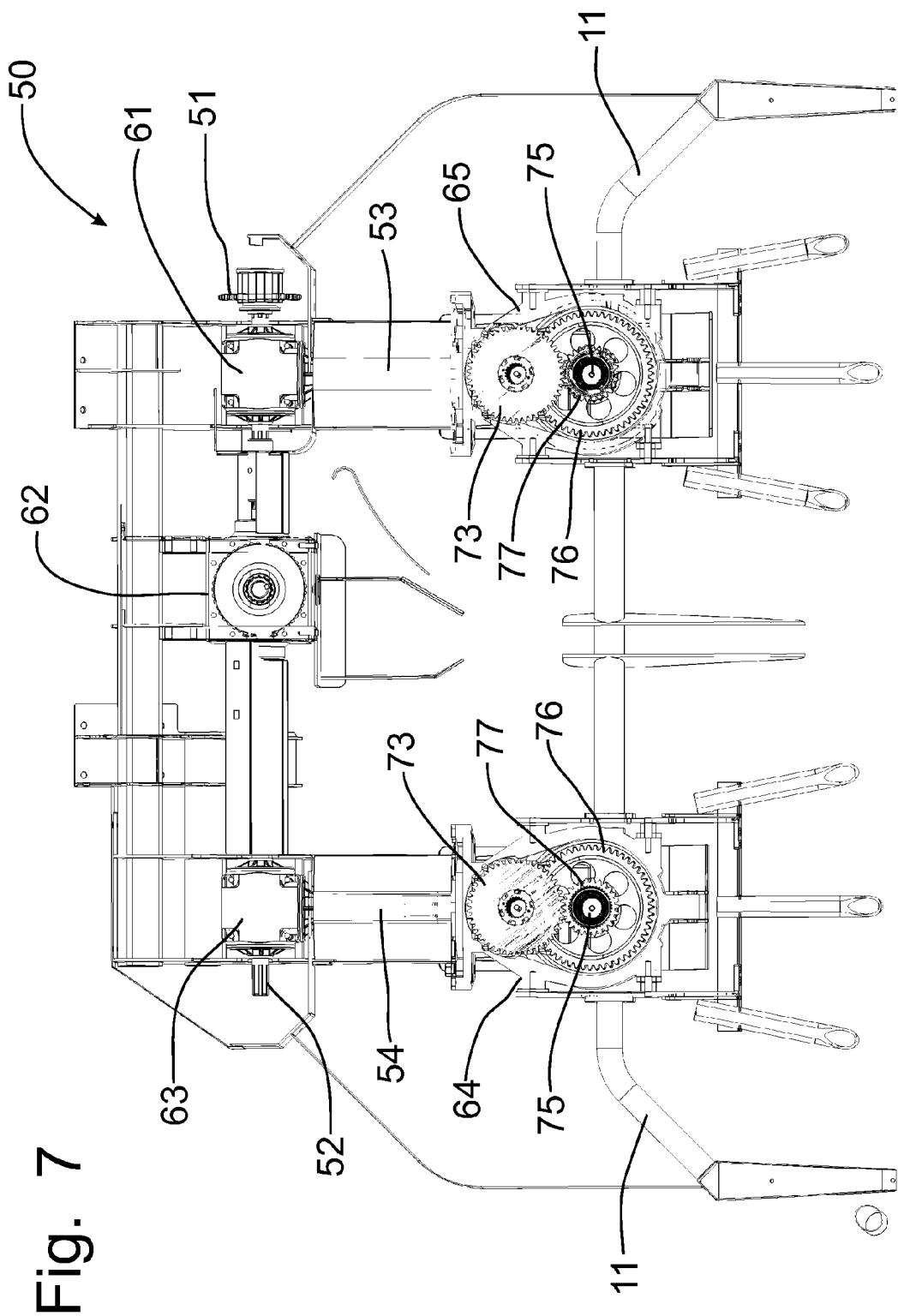
FIG. 7 is a cross-sectional view corresponding to lines 7-7 of FIG. 4 to provide a top plan view of the drive mechanism providing rotational power to the rotary disk cutting members and the rotary transfer member.
Figure 8:
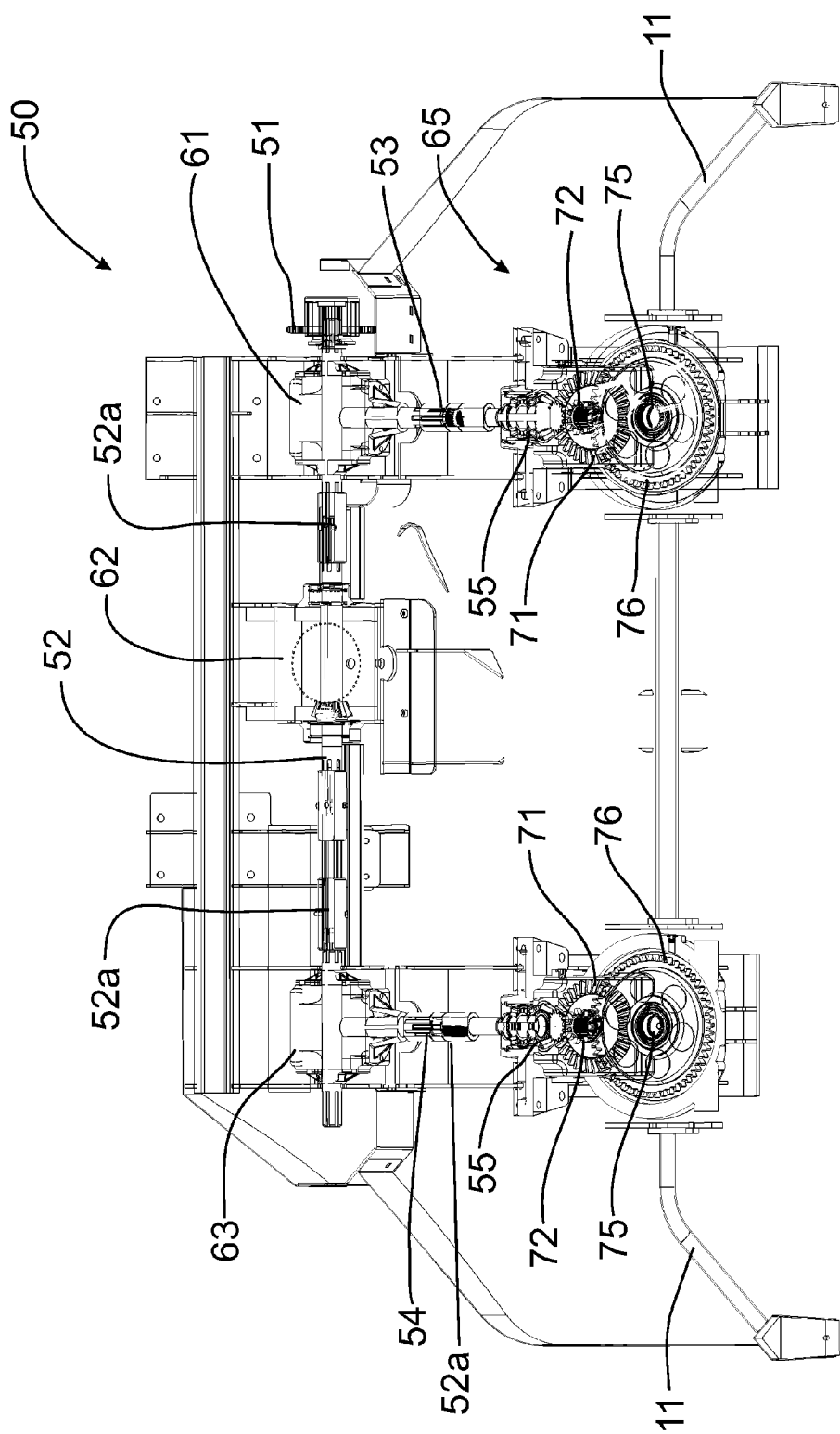
FIG. 8 is a cross-sectional view similar to that of FIG. 7, but taken along a horizontal plane a little lower than the view of FIG. 7 and tilted to a slight upper perspective orientation to depict the internal gears of the respective gear boxes.

Accordingly, a single rotary transfer member 40 is positioned between the two front rotary cutting members 20 and rearwardly thereof to receive severed crop material therefrom and transfer the crop material into the rearwardly positioned cutterhead. The transfer of crop material from the left cutting member 20b to the rotary transfer member engages the rotary transfer member 40 at about 5:00 o'clock on the rotary transfer member 40 and is stripped by the fourth fixed guide plate 34 at about the 1:00 o'clock position. All references above to the positioning of the engagement and disengagement of the crop material from the rotary cutting members 20 and the rotary transfer member 40 is made in conjunction with a top view thereof, as shown in FIG. 2, facing rearwardly. One skilled in the art will recognize that the right cutting member 20a is rotated counterclockwise, while the left cutting member 20b is rotatably driven clockwise, when viewed from the orientation depicted in FIG. 2. The rotary transfer member 40 is also driven in a counterclockwise position, as depicted in FIG. 2.

Referring now to FIGS. 6-9, the drive mechanism 50 for the header 10 can best be seen. The primary drive input is along the left side of the header 10 and is preferably a chain drive that transfers rotational power from the base unit (not shown) to rotate an input drive sprocket 51 and a transverse drive shaft 52 on which the input drive sprocket 51 is mounted. Alternatively, the drive input could come through a belt drive mechanism or a hydraulic motor that is connected to the hydraulic system of the prime mover (not shown) to rotate the transverse drive shaft 52.

The transverse drive shaft 52 is formed of multiple parts to drive a first gear box 61 that transfers rotational power to a first longitudinally extending driven shaft 53 that drives the rotation of the left rotary cutting member 20b through a fifth gear box 65, as will be described in greater detail below. The transverse drive shaft 52 continues through the first gear box 61 to a second gear box 62 near the center of the header 10. The second gear box 62 provides rotational power for the rotary transfer member 40. The transverse drive shaft 52 continues through the second gear box 62 to a third gear box 63 along the right side of the header 10. The third gear box 63 transfers rotational power to a second longitudinally extending driven shaft 54 that delivers rotational power to a fourth gear box 64 to power the right rotary cutting member 20a. One skilled in the art will recognize that spline couplings 52a connect the various segments of the transverse drive shaft 52 so that the drive shaft 52 can be disconnected to permit service, repair or replacement of the individual gear boxes 61-65.

Figure 9:
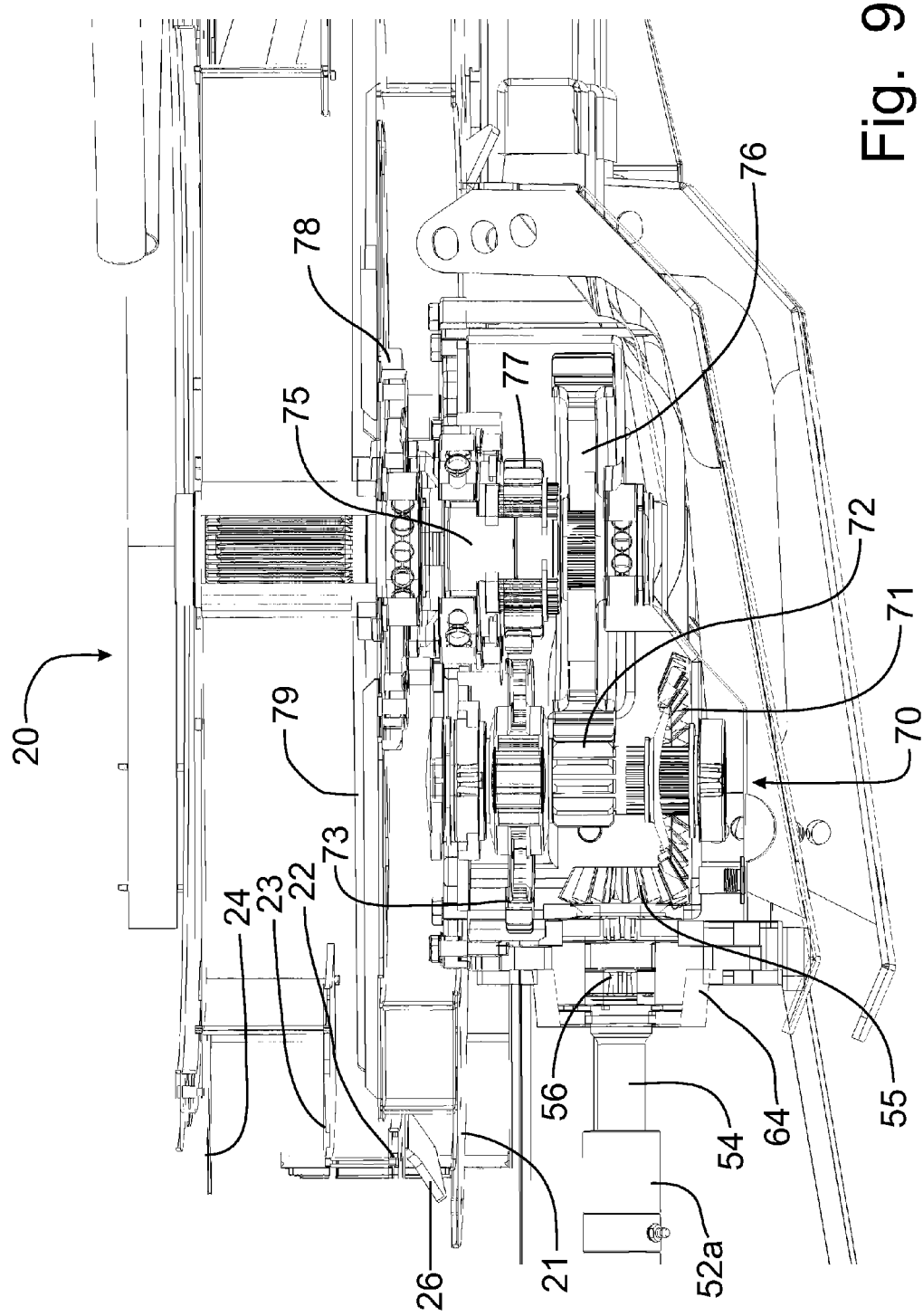
FIG. 9 is a partial cross-sectional view of the header taken along lines 9-9 of FIG. 2 to depict the drive mechanism powering the operation of the right rotary disk cutting member.

FIG. 9 depicts the arrangement of the gearbox 64 for the right cutting member 20b, although the arrangement for the gearbox 65 for the left cutting member 20a is essentially identical, except driven rotationally opposite the right cutting member. The gearbox 64 includes a drive gear set 70 that includes a first driven gear 71 and a vertically spaced first drive gear 72 and a second vertically spaced drive gear 73. The first driven gear 71 is operatively coupled to the pinion 55 mounted on the end of the longitudinally extending driven shaft 54 that is supported in the gearbox 64 by bearings 56. The gear set 70 is driven at a constant speed from the longitudinally extending driven shaft 54; however, the first drive gear 72 is smaller in effective diameter than the second drive gear 73.

The first drive gear 72 is operatively coupled with a second driven gear 76 that is splined onto a vertical driven shaft 75 that is connected by splines at the upper end thereof to the transfer disks 22-24, which are formed as an integral assembly driven by the vertical driven shaft 75. Accordingly, the transfer disks 22-24 are part of a common assembly and are rotated together at the same rotational speed. The second drive gear 73 is operatively coupled to a third driven gear 77 that is smaller in diameter than the second driven gear 76. The third driven gear 77 is mounted on the vertical shaft 75 but is rotatable relative to the al shaft 75, rather than being attached to the vertical shaft 75 to be rotatable with the vertical shaft 75. The third driven gear 77 is connected to the drive assembly 78 through which the vertical shaft 75 passes. The drive assembly 78 is connected to a formed assembly 79 that includes the cutting disk 21.

Since the combination of the small drive gear 72 and large driven gear 76 results in a rotational speed that is slower than the combination of the large drive gear 73 and the small driven gear 77, the cutting disk 21 driven by the combination of the large drive gear 73 and the small drive gear 77 is rotated at approximately nine times faster than the transfer disks 22-24 driven through the combination of the small drive gear 71 and large driven gear 76. The two rotary cutting members 20 are rotated at the same speed to facilitate the transfer of severed crop from the right cutting member 20a to the left cutting member 20b. Similarly, the rotary transfer member 40 is driven through the second gear box 62 at a faster speed than the two cutting members 20 so that the periphery of the rotary transfer member 40 is matched in speed to the larger diameter of the left cutting member 20b, which also facilitates the transfer of the severed crop material from the left cutting member 20b to the rotary transfer member 40.

Thus, in operation, the right cutting member 20a collects severed crop material and conveys the collected crop material around the perimeter of the right cutting member 20a. At about the 3:00 o'clock position on the right cutting member 20a, the collected severed crop material is transferred to the left cutting member 20b to join the severed row crop material collected by the left cutting member 20b. Therefore, the left cutting member 20b from about the 9:00 o'clock position to about the 11:00 o'clock position carries the row crop material collected by both cutting members 20 as the severed crop material is merged to pass between the first and third fixed guide plates 31, 33. Accordingly, driving the two cutting members 20 at the same peripheral speeds allows for a smooth transfer of the collected crop material from the right cutting member 20a to the left cutting member 20b.

Similarly, the rotary transfer member 40 engages the collected and merged row crop material passing through the flow path defined by the first and third fixed guide plates 31, 33 from the left cutting member 20b. Preferably, the tip speed of the prongs 46, 47 on the rotary transfer member 40 are approximately the same tip speed as the prongs 28, 29 on the left cutting member 20b. Alternatively, the rotary transfer member 40 could be driven a little faster such that the tip speed of the prongs 46, 47 are a little faster than the prongs 28, 29 so that the rotary transfer member 40 would be a little more aggressive in taking the severed crop material flowing through the passageway defined between the first and third fixed guide plates 31, 33.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A non-row sensitive forage harvester header, comprising:
a frame;
a pair of rotatable cutting members driven in a counter-rotating manner to sever standing crop material from the ground and to convey the severed crop material rearwardly along a flow path between the cutting members;
a single transfer member rotatably supported on said frame rearwardly of the cutting members to receive said severed crop material along said flow path and to convey said severed crop material rearwardly through a discharge opening for further processing, said rotatable transfer member positioned between said pair of rotatable cutting members and forwardly of said discharge opening, said transfer member being operable to move said severed crop material along a circumferential periphery of said transfer member before conveying said severed crop material rearwardly through said discharge opening for further processing, said flow path being tangential to both said rotatable cutting members and to said transfer member; and
at least two spaced apart guide members defining said flow path for the movement of said severed crop material to said transfer member, a first one of said guide members striping said severed crop material from a first one of said cutting members for conveying along said flow path to said rotatable transfer member, a second one of said cutting members transferring severed crop material from said second one of said cutting members to said first one of said cutting members before said first one of said guide members strips the severed crop material from the first one of said cutting members.

2. The non-row sensitive forage harvester header of claim 1 wherein a second one of said guide members strips said severed crop material from the second one of said cutting members to be engaged with the first one of said cutting members.

3. The non-row sensitive forage harvester header of claim 1 wherein said transfer member includes a rotatable floor member that underlies said flow path along the circumferential periphery of the transfer member.

4. A non-row sensitive crop harvesting header comprising:
a frame;
left and right transversely spaced rotatable cutting members driven in a counter-rotating manner to sever standing crop material from the ground and to convey the severed crop material centrally between said cutting members and then rearwardly along a flow path located between the cutting members;
a single transfer member rotatably supported on said frame rearwardly of the cutting members and positioned between said left and right rotatable cutting members to receive said severed crop material along said flow path and to convey said severed crop material rearwardly, said transfer member being operable to move said severed crop material along a circumferential periphery of said transfer member as an extension of said flow path before conveying said severed crop material rearwardly through said discharge opening; and
said flow path being defined by at least one fixed guide plate including a first fixed guide plate dislodging crop material from a first one of said cutting members and directing the crop material into engagement with a second one of said cutting members whereby said second one of said cutting members conveys said crop material rearwardly along said flow path toward said transfer member, said flow path extending from said first one of said cutting members along said second one of said cutting members to said transfer member being substantially linear and tangential to both said rotatable cutting members and to said transfer member.

5. The non-row sensitive crop harvesting header of claim 4 wherein said first fixed guide plate dislodges crop material from said right cutting member for transfer to said left cutting member.

6. The non-row sensitive crop harvesting header of claim 4 wherein said first fixed guide plate dislodges crop material from said first one of said cutting members when said first one of cutting members has conveyed the crop material to a central position on said header transversely from an axis of rotation of said first one of said cutting members.

7. The non-row sensitive crop harvesting header of claim 6 wherein a second fixed guide plate is supported on said frame forwardly of said first fixed plate to define a portion of said flow path for the movement of crop material from said first one of said cutting members to said second one of said cutting members.

8. The non-row sensitive crop harvesting header of claim 6 wherein a third fixed guide plate is supported on said frame to dislodge crop material from said second one of said cutting members for movement to said transfer member, said third fixed guide plate forming a portion of said flow path with said first fixed guide plate.

9. The non-row sensitive crop harvesting header of claim 8 wherein said third fixed guide plate dislodges crop material from said second one of said cutting members rearwardly of a transverse line extending through an axis of rotation of said one of said cutting members.

10. The non-row sensitive crop harvesting header of claim 8 wherein a fourth fixed guide plate dislodges crop material from said transfer member rearwardly of an axis of rotation of said transfer member for discharge of said crop material from said header, a fifth fixed guide plate being supported on said frame to define a portion of said flow path with said fourth fixed guide plate along which crop material is conveyed for discharge from said header.

11. The non-row sensitive crop harvesting header of claim 10 wherein said first one of said cutting members is said right cutting member, said second one of said cutting members being said left cutting member.

12. The non-row sensitive crop harvesting header of claim 4 further comprising:
a drive mechanism supported on said frame to power the rotation of said left and right cutting members and said single transfer member, said drive mechanism including a transversely extending power input shaft engaged with a first gear box to transfer rotational power forwardly to said left cutting member, a second gear box operably connected to said transfer member for driving the rotation thereof, and a third gear box to transfer rotational power forwardly to said right cutting member.

13. The non-row sensitive crop harvesting header of claim 12 wherein each of said left and right cutting members include a lowermost cutting disk operable to sever standing crop material and crop engaging members above said cutting disk to engage severed crop material, said drive mechanism further includes fourth and fifth gearboxes operatively connected to said first and third gearboxes, respectively, each of said fourth and fifth gearboxes including a first gear set for rotating the crop engaging members of the corresponding said cutting member and a second gear set for rotating the corresponding cutting disk faster than said crop engaging members.

14. The non-row sensitive crop harvesting header of claim 13 wherein each of said first and second gear sets have a drive gear and a driven gear, both said drive gears being affixed to a first spindle, the driven gears being mounted on a second spindle with a first driven gear being affixed to said second spindle to rotate said crop engaging members connected to said second spindle, a second driven gear of said second gear set being mounted on said second spindle for rotation relative thereto, said second driven gear being coupled to the corresponding said lowermost cutting disk.

15. A method of harvesting crop material, comprising the steps of:
severing standing crop material from the ground with a non-row sensitive forage harvester header having a first and second rotary cutting members positioned at a forward periphery of said header to sever standing crop material from the ground;
conveying the severed crop material along a forward portion of a circumferential periphery of each said rotary cutting members toward a center of said header;
stripping the severed crop material from said first rotary cutting member by a guide plate to guide the severed crop material along a flow path from said first rotary cutting member to the second rotary cutting member;
removing the severed crop material from the second rotary cutting member by a second guide plate to transfer the severed crop material along said flow path from said second rotary cutting member to a rotary transfer member positioned rearwardly of and between said first and second rotary cutting members, said flow path extending from said first rotary cutting member past said second rotary cutting member and to said rotary transfer member being substantially linear and tangential to all of said first and second rotary cutting members and said rotary transfer member;
transporting said severed crop material around a portion of a circumferential periphery of said rotary transfer member; and
dislodging said severed crop material from said rotary transfer member by a third guide member to direct the crop material from said rotary transfer member rearwardly for discharge from said header.

16. The method of claim 15 wherein said guide members define a flow path for severed crop material from between said first and second rotary cutting members to a discharge point rearwardly of said rotary transfer member.

17. The method of claim 15 wherein said stripping step strips said severed crop material from a right cutting member for engagement by a left cutting member, said removing step transferring said severed crop material from said left cutting member to said rotary transfer member.

* * * * *